July 11, 1939.  G. T. SOUTHGATE  2,165,309
ELECTRIC POWER CONVERSION
Filed April 18, 1936  3 Sheets-Sheet 1

INVENTOR:
George T. Southgate

July 11, 1939. G. T. SOUTHGATE 2,165,309

ELECTRIC POWER CONVERSION

Filed April 18, 1936     3 Sheets-Sheet 2

INVENTOR:
George T. Southgate

Patented July 11, 1939

2,165,309

UNITED STATES PATENT OFFICE 2,165,309

ELECTRIC POWER CONVERSION

George T. Southgate, Forest Hills, N. Y.

Application April 18, 1936, Serial No. 75,080

24 Claims. (Cl. 171—228)

This invention pertains to the conversion of electric power from alternating to direct currents and conversely, or from direct through alternating and back to direct currents; wherein numerous working voltages in a polyphase transformation are commutated in sequence by synchronously actuated contacts. With respect to a portion of its operation the present invention is related to the one set forth in my U. S. Patent 1,967,135, issued July 17, 1934, and entitled "Commutating method and device". However, the new invention is directed to conversion rather than commutation, and embodies certain improvements based partly upon principles additional to those exploited in the earlier device.

More specifically, this invention comprises a method of and apparatus for effecting the stated conversion through closely coupled, unitary, polyphase, static transformation combined with commutation, and further combined with the supplying of transformer magnetization by alternating exciting currents independently of the commutation. The transformation thus delimited is that wherein numerous transformer units wound on a core system in common, are so interconnected on their primary and secondary sides, and so operated, that a polar winding formed of the system's total primary coils and another of its secondary coils, coact to give polyphase induced voltages in each winding. Each of these transformer units or couples consists of at least one primary and one secondary coil, ferromagnetically coupled together with nearly zero flux leakage.

Magnetically and electrically the transformer units are so interconnected that the magnetomotive forces of their exciting currents jointly produce a field of relatively travelling polarity. In turn, this field induces in the primary and secondary windings, voltages equal in number of phases to the number of unitary couples per pole.

In addition to being operated dually with respect to the transformation, the commutation in the case of conversion from direct current to direct current must be performed substantially cosynchronously, i. e., so that each of the transformer unitary couples in its commutative turn has its secondary and its primary coils shortcircuited simultaneously and for approximately the same period, by contact members of respectively the secondary and the primary commutators.

For the performance of the commutative function in my present invention, the preferred method is the processional vibratory contacting disclosed in my aforesaid Patent 1,967,135.

The removal of the burden of stored energy from the commutation is partly effected by practically eliminating leakage inductance through close coupling, as in the previous device described in my said Patent 1,967,135.

The unburdening is advanced by coupling the primary-secondary coil pairs as units ferromagneticaly separated from other units. Thereby the primary-secondary ampere-turns of load currents within a couple are kept equal and opposite and of zero net flux (hence of zero flux change), protected by this construction from interaction with load ampere turns in other couples.

In converting from direct current to direct current, where good commutation on both sides must be accomplished, this unburdening is completed by the addition of the important element of shortcircuiting the primary coil of each transformer unit couple during the commutative shortcircuit of its secondary coil. Thereby the opposing magnetomotive forces of the secondary and primary load currents are kept truly equal and mutually neutralizing throughout the commutative cycle. Hence there is no flux change in the core due to commutation, and no corresponding storage of energy to be removed and reinstated. The exciting current is not commutated, but is carried directly through polyphase leads into the primary winding. For this reason and because of the stated duality of action, the commutation proceeds under the ideally favorable condition of neutralized inductance.

Among the objects of my invention, a major one is to provide power-conversion apparatus that approaches the ordinary static transformer (polyphase form) in structural and operative simplicity, while including within itself the function of voltage transformation as well as that of conversion.

Another object is to provide that this relatively simple apparatus shall have energy efficiency nearly as high as that of a good alternating-current transformer of equal rating, as distinguished from the much lower overall efficiency of a rotary converter combined with its transformers usually required for suitable voltage ratios.

A further object is to make available such improved conversion apparatus that further will be capable of performing its service without serious commutative sparking under normal loading or load-changing.

An additional object is to provide apparatus of which the manufacturing cost under comparable conditions is far below that of any competitive complete conversion apparatus, throughout a long range of power and voltage ratings.

Another object is in some cases to complement the commutation with inductive means cooperative therewith to minimize the magnitude of the rush of current in the event of and into a short-circuit of output direct-current mains.

An object related to the foregoing ones is to exploit in their realization the benefits of the above-outlined scheme of unitary, closely coupled transformation combined with cosynchronous dual commutation.

A still further object is in some cases to provide for the excitation of the transformer and other electromagnetic parts of the converter by means including electrostatic condensers or their electrical equivalent.

With these and other objects in view, my invention comprises the novel method of conversion and the improved apparatus for its performance explained in these specifications and now to be detailed in relation to a typical embodiment and to the accompanying drawings illustrative thereof. It is to be understood that the invention is not limited to this exact disclosure, except as may be required by the claims. Similar numbers refer to similar parts throughout the drawings, whereof—

Figures 1, 2, 3:
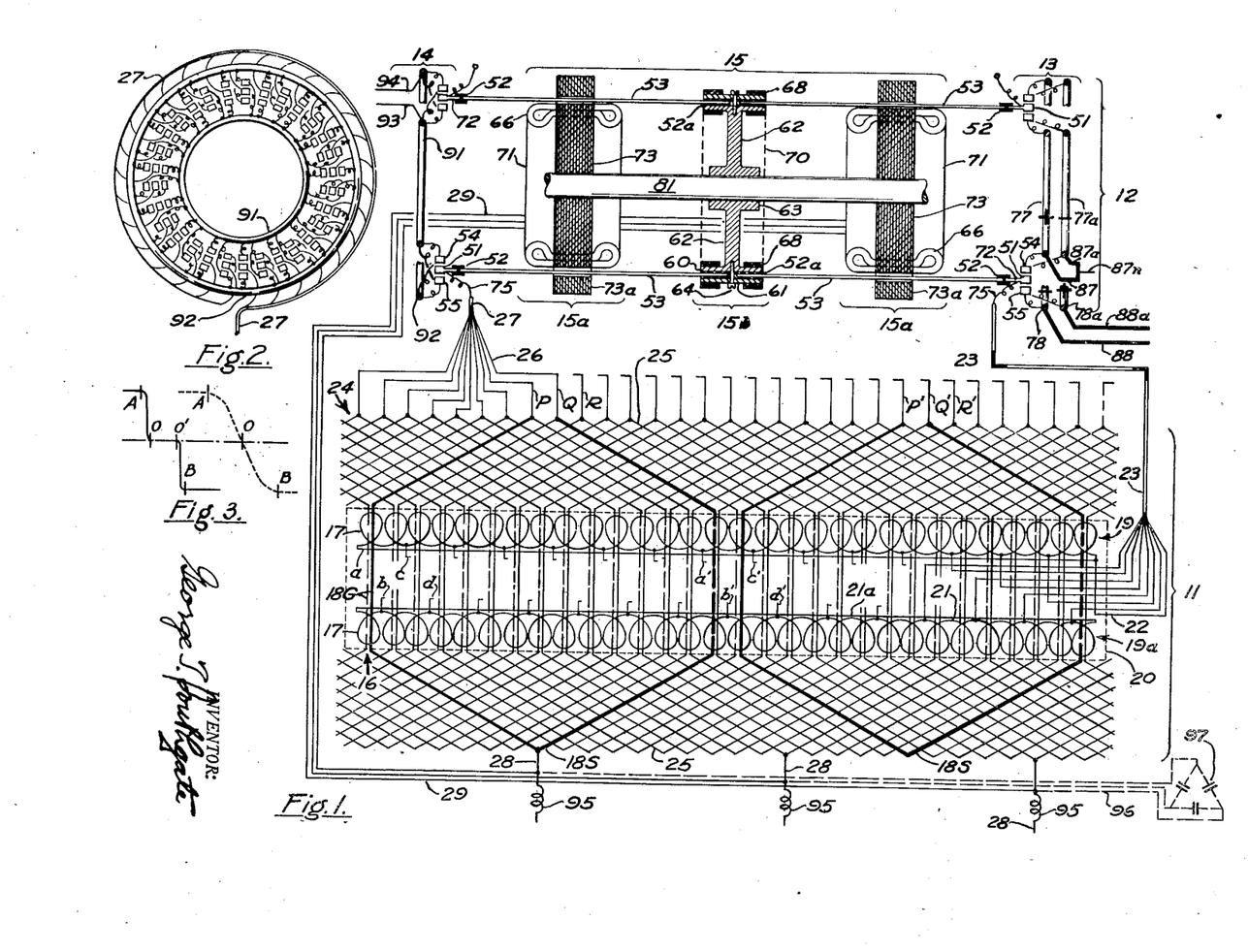
Fig. 1 is a diagram schematic of the principal members of my improved converter in an example for converting from direct current to direct current, and of the electric interconnections. The lower part represents the polyphase transformer; and the upper portion outlines in elevation an example of the dual commutative apparatus, in a cylindrical assembly of the vibratory type.
Fig. 2 is a diagrammatic end view of one of the vibratory commutators, and of its electric connections.
Fig. 3 is a diagram of the current-time curves of coils under two types of commutation; the solid-line graph representing the case where the self-inductance of the commutated coil is nearly zero as in my invention, and the broken-line curve showing the ordinary case where the coil self-inductance is of considerable magnitude.
Figure 4:
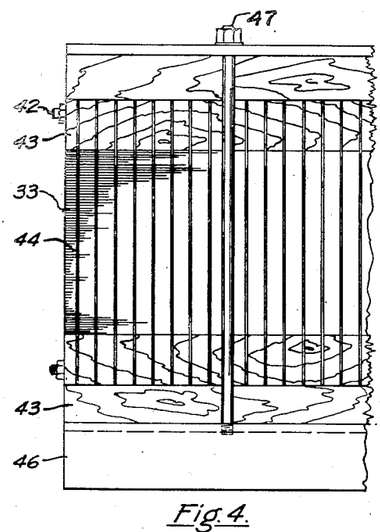
Fig. 4 is an elevation of the left half of a polyphase transformer constituting a part in my improved converter.

Referring first to Figs. 1, 2 and 3, the polyphase transformer as a whole is designated by the numeral 11 and the complete commutative apparatus by 12.

The commutative system embraces the secondary commutator 13, the primary commutator 14 and, for the illustrated form, the reed-actuative system 15. The last here comprises the two reed actuators 15a, 15a and the reed-supporting and polarizing assembly 15b. The commutative and actuative parts are here shown in a cylindrical assemblage; the diagrammatic section, Fig. 1, depicting the upper and lower reeds and for clarity omitting the intermediate ones. The entire commutative system 12 could as well be spread flatly above the transformer; but it is believed that the circular form is better adapted to clear showing by diagram.

The preferred general structure of the transformer is that of a shell-type, polyphase unit (hereinafter detailed with reference to Figs. 4 to 9 inclusive), modified by increased multiplicity of phases and by the introduction of thin gaps into the ferromagnetic circuits. Its windings jointly comprise numerous (in the example thirty) unitary coil couples 16, each made up of one or more (here two) secondary coils 17, 17 and at least one primary coil 18G. Emphasis is placed upon the separate integrity of these coil couples, in relation to the dual commutative short circuiting of the secondary and primary coils of each couple as a unit.

It is equally an essential of the invention that the primary and secondary elements of these couples be electromagnetically closely coupled to one another; and in Fig. 1 the showing of the secondary coils 17 as loops embracing the vertical lines representing the primary coils 18G is intended so to indicate.

In this example the secondary system has been shown as the low-tension side of the converter. Its transformer portion has been divided into two similar and independent windings 19 and 19a, formed of the interconnected coils 17, 17. Through the coordination of this arrangement with a like division of the secondary commutative members, the halves of the converter's output may be connected in series, in parallel or in three-wire arrangement, as will be further explained hereinafter.

The core system 20 of the transformer is diagrammed in Fig. 1 as the rectangular frame of finely broken lines surrounding elements 17 and 18G.

Each secondary winding is here made by connecting together its component coils 17 in the fashion of a simple Gramme ring, by means of the coil extensions or leads 21. In a circular structure these extensions would be all alike, but in the illustrated straight-core design the leads 21a of the end coils are naturally elongated. The commutator leads 22 of the secondary winding, tapped to the coil extensions 21 and 21a, may be bunched into the secondary group or cable 23, and are led to the corresponding commutator 13.

The primary system 24 is formed by interconnecting the coils 18G by means of simple wire end-loops 25, 25, first into the hexagonally indicated pairs 18S and thence into the complete, reentrant winding 24. In the conventional representation of this winding it is to be understood that the lefthand interconnections are continuations of those at the right, as if the arrangement were circular.

The suffixes G and S identify parts considered respectively as Gramme-ring and Siemens-drum elements in the same winding. For with respect to its coil interconnections, the specimen primary winding is of the style of a Siemens drum. As to the arrangement of the coils on the core, the primary and secondary systems alike may be considered wound upon a straightened Gramme ring having two magnetic return paths.

Figure 5:
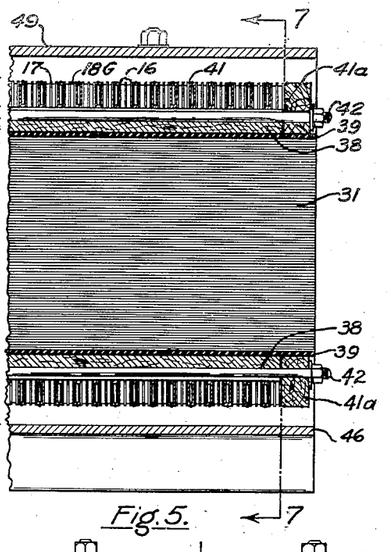
Fig. 5 is a vertical midsection of the similar, right half of the same transformer as in Fig. 4.
Figure 6:
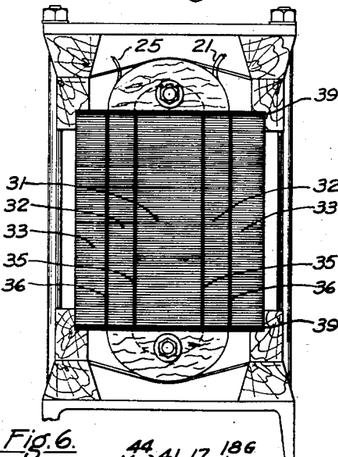
Fig. 6 is an end elevation of the said transformer.
Figure 7:
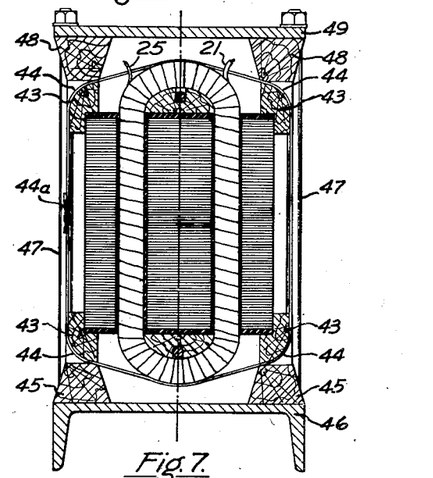
Fig. 7 is a vertical cross-section of the transformer, in the plane 7—7 identified in Fig. 5.
Figure 9:
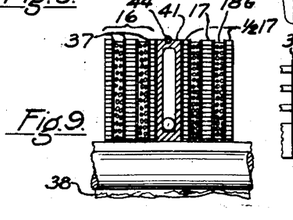
Fig. 9 is a fragmentary vertical midsection of the upper portion of the transformer proper, depicting the assembly of the primary and secondary coils into the unitary couples (16, two shown), the electric insulation and the spacing member (41).

In Fig. 1 each vertical line 18G of the transformer primary winding represents not merely an active side of the usual hexagonal coil of a Siemens winding; but as best seen in Fig. 5, each indicates a coil of any uniform number of turns, in a plane perpendicular to that of the end connections of Fig. 1. In Fig. 1, again, those elements 18G that are represented by full lines may be considered as upper coil-sides in the sense of being members of a two-layer Siemens winding, and those indicated by broken lines as the lower occupants of the slots. In actual construction they may be more conveniently assembled as flat coils placed right and left to one another, and interspersed with flat secondary coils, as shown in Figs. 5 and 9. The showing of the secondary coils 17 in Fig. 1 as loops rather than as flat members is intended to be conventional and clarifying.

To the thirty wire loops 25 interconnecting the primary coils on one (here the upper) side are tapped an equal number of commutator leads 26; these leads may be gathered into a group or cable 27 and are led to the primary commutator 14. While any appropriate style of intercoil connection may be employed to complete the winding 24, the one illustrated is favored because it facilitates the formation of symmetrical waves of polar magnetomotive forces acting upon the steel core. From the showing of two Siemens coils in heavier lines, the example will be recognized as a bipolar, two-layer, singly reentrant, short-pitch winding; the three-phase input leads 28 being connected at points 120 electrical degrees apart.

It will be observed that for each of the two separated secondary windings 19, 19a the commutator leads 22 are tapped at fifteen alternating intercoil junctions rather than at all thirty, and that the steps of this tapping are staggered as between the two sets. The object of this arrangement is to match in the transformer the sequence of the two separate sets of contacts that are mutually interspersed as odd and even members of the secondary commutator. The phase interrelations of the primary and secondary windings, and of their commutators, are further detailed hereinafter.

In the illustrated transformer, each coil-couple consists of two flat primary coils 18G and two flat secondary coils 17 mutually interspersed. In another form of the converter which I have built each couple comprises a coil of wire as the high-tension member, within a circular copper tube internally and externally insulated as the low-tension member; the whole unit being shaped as a loop linked with the magnetic core in the same manner as in Fig. 7. These couples were formed by inserting six wires into each tube, bending the unit initially to the form of a U, inserting the bend into holes in an assembled core, shaping the coil ends, and soldering the six wires in series with each other.

The actuative system for the commutators is here excited by three-phase currents taken by the leads 29 from the input leads 28 and led into the actuative windings 71, 71 (described hereinafter), in proper space phase. The correct phasing can be determined by design, and readily checked by oscillographic voltage tests in trial operation. The actuative currents could as well be taken from the secondary winding by similar three-phase tapping, or all of the (say thirty) coils of each actuator winding separately connected to proper points in either the primary or the secondary of the transformer, or even to a third winding therein.

The core elements shown in Figs. 4 to 8 inclusive are stampings of transformer sheet of good quality such as silicon steel, about 0.014 inch thick. Only simple, rectangular shapes are required for a rectilinear transformer assembly those of the central core 31, the teeth 32, 32a and the lateral return members or yokes 33, 33. Separating the teeth are slots 34 receptive to and of the same number as the coil couples 16. The direction of lamination of the core and yokes is properly limited to that illustrated. In the case of the teeth, however, the design principles would not be violated if their layers were arranged at right angles to those of the larger strips and parallel to the planes of the flat coils; because in the practical absence of leakage the flux traverses the teeth rectangularly from core to yokes. This arrangement permits shearing the tooth strips in larger pieces and, in addition, simplifies their stacking.

The laminated members may be bound into their respective stacks, as by cementing the sheets together with thinly intervening varnish, before they are assembled with the coils. When the steel members are assembled according to the illustrated design, magnetic gaps are provided between the central core and the teeth, and between the teeth and the lateral members. The thickness of these gaps may be conveniently fixed by interposing strips 35 and 36 of thin insulating material such as fish paper, say 0.005 inch thick, between the laminated faces of respectively the inner and outer gaps.

The magnetic gaps are provided for two main purposes, the one structural and the other operative. It will be seen from the foregoing explanation that the making and assembling of the parts is facilitated by their inclusion. In addition the correct, sinusoidal distribution of the flux density from tooth to tooth at any instant is assured by gaps of sufficient thickness in collaboration with proper windings and polyphase excitation.

One gap instead of two may be employed on each side of the central core 31, by making half the teeth 32, 32a integral with one yoke 33 and half with the other, assembling the resultant comb-shaped lateral members by placing the coil-couples 16 in their slots 34, and clamping as in the form having two gaps on each side. Or for some special cases the gaps may be entirely eliminated by merging the teeth with the core as well as with the yokes, and by shaping the teeth long and narrow in order to increase their reluctance to a value comparable with that of the gaps in the tooth circuits as already outlined. In general the form first described, with two magnetic gaps in series on each side, is much preferred.

Each lateral yoke 33 is about half as wide as the central core 31. The dimensions of the teeth, in combination with the other magnetic and electric dimensions, should be such that the flux density in the teeth approximates that in the core and return yokes. The induction in all of these parts should be of an economical value, such as 14 kilogausses maximum or 90,000 lines per square inch for grades of steel now standard; and the desired density can be attained by design computation according to formulae commonly employed for windings having approximately sinusoidal spatial distribution of the polar flux, as in induction motors. In order to compensate for the discontinuity of the core structure at the ends, the teeth 32a beyond the first and last of the coil couples should be wider than the intermediate teeth 32. Specifically, these end teeth should be about equal in width to the yokes 33; so that the coils at and near the ends shall be threaded by substantially the same maximum of flux as the other coils. It will be understood that when a maximum amplitude of the flux wave approaches a core end, there should not be any crowding of a few teeth thereby, unequally with the others.

The normal course of the flux includes its dividing out from the central core at one polar zone, into the corresponding teeth according to an approximately sinusoidal distribution from each tooth 32 to the next, thence via the paths 33, 33 and through the teeth in the other polar region in the same manner, back into the core. An end tooth 32a on one side has to carry all the flux that in the other part of the course is thus divided among a quarter (in the illustrated transformer seven) of the intermediate teeth of that side. If it were no wider than the others, the crowding would be so great that the end tooth would not carry its share in its turn.

Provision of the wider end teeth 32a causes the core system to operate as if it were endless (circular), and so has a part in making feasible the preferred construction wherein the coils may be form-wound and merely slipped onto the straight core. This may be understood when it is recognized that the described rectilinear core system provides paths for the polar fluxes that are of substantially the same reluctance wherever the poles may be in their travel; because such reluctance consists largely of the portion in the uniformly thick air gaps, and the metallic parts of the flux paths are effectively of the same cross-sections.

As the rectilinear core may thus be made to give symmetrical magnetic behavior, its form is preferred for economy of structure; but it need not be employed to the total exclusion of circular arrangements. Stampings resembling those of induction motors may be used, preferably modified by the provision of air gaps thinner than those usual in such motors, and with the same number of and spatially matched teeth in the inner and outer members. Form-wound coils may be used; and while preferably of the familiar hexagonal shape, they should be made with primary and secondary turns assembled together into closely coupled units in the same slots.

In such a circular form, primary and secondary windings thus would both be formed in both inner and outer core members, and not separated therein as are the rotor and stator windings of induction motors. If they were divided as outer primary and inner secondary systems on the respective cores, their linkage could be made little or no closer than the rather leaky coupling of induction machines. And while under these conditions the commutative operation might be made reasonably satisfactory within certain design limits or by the provision of auxiliaries to compensate for the accompanying reactance, it is simpler and more satisfactory to build the winding as a closely coupled unit having primary and secondary coils in the same slots.

The foregoing practical variations of rectilinear and circular core structures are based upon the facts that a polar magnetic field travelling in a straight core is a rotating magnetic field on an infinite radius, that this field may be developed by the excitation of a polyphase primary winding linked with the core and, that in a winding positioned in and subjected to its influence, such a field can induce electromotive forces capable of being commutated to yield a direct current.

Again referring to Figs. 4 to 8 inclusive and now including Fig. 9, the assembling of the rectilinear polyphase transformer may best be performed by arranging together and securely clamping in place prepared flat coils 17 and 18G, stacked laminations of the four sizes 31, 32, 32a and 33 aforementioned, and suitable insulative and binding parts now to be explained. The coils are form-wound of conventional magnet wire or ribbon such as cotton-covered copper, provided with leads 21 and 25 and covered in the usual way with wrappings of insulative tape. In order to fix the thickness of the inner magnetic gaps and also to provide part of the insulation of the coils from the core 31, the spacing strips 35, 35 are placed against the right and left faces of the core.

The coils 17 and 18G in proper distribution and interspersed with punched separators 37, preferably thin sheets of high-grade insulation, are then slipped over the core. The coils with these sheet insulators are now assembled into the unitary couples 16; and within the inner curves of the coils and of the sheets 37 may be slipped long, semi-elliptical, insulating arch-blocks 38, 38 fitting snugly against the top and bottom of the core-aligning members 39, 39 hereinafter explained, and holding the coils in proper vertical relation to the core structure.

For the connection scheme already explained, each couple 16 is here formed of two primary coils 18G, 18G corresponding to the full and broken vertical lines in Fig. 1. The secondary element of the couple is also formed of two coils, corresponding to the two loops each in Fig. 1 but, as best seen in Fig. 9, these secondary parts consist of one full coil 17 in the middle of the couple and two lateral half-coils, marked "½17". Such division into outer half-coils is in accordance with the known practice.

Figure 8:
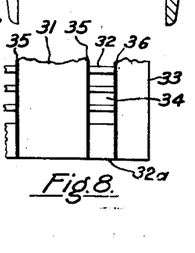
Fig. 8 is a fragmentary plan view of the assembly of the three shapes of core laminations, as explained hereinafter.

Referring now to the magnetic structure, and particularly to Fig. 8, between and beyond the coil couples 16 are placed the teeth 32 and 32a respectively, formed of previously stacked laminations as aforesaid. Next, with the outer, magnetic-gap spacing strips 36, 36 intervening, the pre-stacked yokes 33, 33 are pressed against the left and right ends of the teeth; and the assembly is thus ready for the placing and clamping of the holding members.

For aligning the several stacks of laminations with each other and with the coils, there may be placed above and below the stacks slotted plates 39, 39, preferably of stiff insulation such as fibre board.

Between the outer sheet insulation 37 of each couple 16 and that of the next, and fitting around the arch-blocks 38, 38, there may be inserted metal spacing plates 41, 41 of thickness equal to that of the teeth 32 and of a pattern approximating that of the portion of the coils outside of the core system. The end-blocks 41a, 41a may be made of hardwood and of a pattern differing somewhat from that of the intermediate ones 41. Through a slot in each arch-block 38 and a hole in each end-block 41a there may be inserted the stud bolt 42, the nuts of which may be drawn against the end-blocks 41a and the whole assembly thus clamped.

The four angle-bars 43, 43 of hardwood or other insulation may be placed on the longitudinal outer edges of the magnetic structure; and there may be employed a means of transverse clamping which the applicant has found economical and satisfactory in actual construction. It is that of passing bands 44 of steel wire or strap around the girth of these angle-bars and over the curved rims of the spacing plates 41 and, by means of tools commercially available, tightly drawing up the bands into twisted or otherwise locked splices 44a. Like the plates 41, the bands are insulated from the laminations, and since they embrace only equal and opposite fluxes they are not themselves secondary inductors. Their clamping action is actually assisted by the strong magnetic pull of the laminations across the magnetic gaps aforementioned.

Thus assembled and banded, the transformer may be supported by setting the lower angle-bars 43, 43 upon lower spacing blocks 45, 45 and suitably bolting down the entire structure, as to the base-channel 46. This may be done by means of the bolts 47, 47, upper spacing blocks 48, 48 and upper plate 49. The last may become the platform of the complete commutative apparatus, not here detailed beyond the example shown schematically in Fig. 1.

The converter may be enclosed in a suitable housing, not forming a part of my invention and not here shown; and it may be cooled by known means or by improved means employing hollow, fluid-circulating members as hereinafter described.

In repairing or altering the transformer it is only necessary to disconnect electrically some or all of the coils, remove the bolts 47 and 42, cut the bands 44, remove the plates 41, 41a, teeth 32, 32a and yokes 33, 33, and slip off the coils 18G and 17 that are concerned. These coils may then be repaired or replaced, and the structure again assembled as already outlined.

Referring now to the vibratory, dual commutative assembly typified in Fig. 1, the reed-actuative system 15 serves both the low-tension commutator 13 and the high-tension commutator 14. As these low- and high-tension structures are identical in principle and need vary only in dimensions appropriate to their current capacities and voltage ratings, or for reasons of convenience such as those of external connections of their busses, they will mainly be described singly. Since the improved commutative apparatus described in my mentioned Patent 1,967,135, according to page 5, lines 115–126 inclusive may be employed with and as a part of electric converters, etc., it is useful to consider that apparatus in relation to the specific kind of converter comprised in my present invention. As a convenience to that end, I am applying to the commutative members in Figs. 1, 2 and 3 hereof such reference numbers in the range 51 to 88 inclusive as will suggest the sufficiently similar parts in Figs. 5, 6, 7 and 8 of the prior patent. The present specification determines its own significances of the parts thus identified, without being modified by or modifying the prior specification.

Each vibratory contact 51, through the neck portion or stud 72 and insulative coupling 52, is supported on the free end of cantilever reed 53. In addition to the coupling 52 there may be provided extra insulation 52a at the clamped end of each reed, if warranted by the voltage of the operation. The stationary contacts 54 and 55 are spaced from the vibratory contacts 51 by supporting and adjusting means not shown, at such distances that at the extremes of their swings the moving contacts reach and bear upon the stationary members for the short period required by the commutation.

Since with the neutralizing of inductance the reversing of current in the transformer coil may be done almost instantly, the criteria of the contacting period for the members of the commutator are: (1) the proper sharing by each contact with its neighbors of the burden of the current passing through the active group in question, and (2) the reproduction in the primary side of a coil couple, of timing and magnitude of ampere-turns substantially equal to those on its secondary side during the shortcircuiting of the commutated coil, in order that the said neutralizing of inductance throughout commutation may indeed be realized. In the example of converting from direct current to direct current, the second requirement is easily satisfied by equalizing the mechanical behavior of the primary and secondary contacting, and this equalization may be readily checked by oscillographic observation. The first criterion, similarly checked during adjustments, is met by such setting that at any instant a sufficient number of contacts are simultaneously engaged to provide the total working area required by the output and the rating of the contact material in amperes per unit area, without shortcircuiting enough coils at the contact zone to trespass materially upon their induced voltages. Ordinarily it is convenient to practice a schedule of contact time overlapping that is suited to the illustrated example.

That is to say, this schedule may be such as to cause two coils of each winding 19, 19a and four coils 18G in winding 24 to be shortcircuited at all times in each commutative zone, as explained hereinafter with respect to certain ordinal numbers and letters. The contacts may be sized according to this number of contacts in simultaneous engagement.

Referring to the supporting-polarizing structure 15b, the reeds 53 are clamped, with or without the thin insulation 52a, upon individual crossheads 60 by means of the steel cover-plates 61 and screws 64. The crossheads 60 are preferably integral with the mounting flange 62, and these parts must be of magnetic material such as cast iron or steel. Through a collar 63 the plate 62 is supported upon beam 81. This part 81 is not a rotary shaft as might appear, but is a cylindrical steel structural member, itself supported upon other members not shown. The polarization of the reeds is imparted by a winding 70, diagrammed by broken lines and made up of coils 68 individual to the reeds, connected preferably in series and excited from the direct-current mains of the converter.

Partly for coordination in the scheme of duplicate output busses described hereinafter, the direction of polarization of the reeds is alternately north and south from one to the next; and each reed vibrates in nearly opposite phase to that of its next neighbor. The reeds are preferably made at least in part of metal having high magnetic retentivity such as hardened carbon steel, in order that after a period of operation they may remain sufficiently polarized to respond selectively to the actuative electromagnetism upon the restarting of the converter. Ideally, the magnetomotive forces of the coils 68 should be little more than sufficient to maintain the permanent magnetism of the reeds at a relatively high value, against demagnetizing influences.

In the actuator 15a the control winding 71 is here of the type of an armature of say a synchronous motor, assembled from form-wound coils 66. It is mounted in open slots of a circular, laminated transformer-steel core 73; and when excited from the polyphase leads 29 its effect is to produce a field of rotating magnetic polarity, like that of a synchronous or induction motor. The return path for this field is the ring 73a of laminated steel. The reeds 53 when at rest stand midway between the core 73 and the ring 73a, in the working gap. When operating, the swings of the reeds for the meeting of contacts 51 with members 54 and 55 is insufficient to cause them to touch the core or ring.

Thus each (e. g., a maximal) amplitude of the reed vibration rotates around the commutator at speed synchronous with the travel of the flux polarity and voltage induction in the transformer, if the number of poles in the actuator winding 71 is the same as their number in the transformer, as ordinarily. If the transformer is multipolar its pairs of poles may be paralleled by connecting its leads 22 and 26 to the respective commutators 13 and 14 having reed-actuators 15a, 15a whose windings 71, 71 are only bipolar. In the latter case the speed of shifting of the actuator's flux is synchronous with that of a pair of transformer poles; and one kind of actuator winding will serve a wide variety of transformer connections.

Each wire of the cable 23 or 27 is connected to the neck 72 of its appropriate vibratory contact 51, as by the flexible lead 75. In the low-tension commutator 13 the stationary contacts 54 and 55 are selectively connected to the copper rings 77, 77a, 78 and 78a, of which the first and fourth may be positive and the second and third negative busses, as marked in Fig. 1. This type of connection is further explained as follows.

For the commutator 13, the pairs of busses are seen to be double. The mentioned selective connection of the contacts 54 and 55 to these duplicate busses and that of the moving contacts 51 to the two low-tension transformer windings, together with the scheme of alternate polarization and alternate direction of vibration of the reeds from one to the next, give the joint result that two spatially interspersed but electrically separate commutators are created, and that these commutators serve the two similarly qualified windings 19 and 19a. Specifically, if busses 77 and 78 are to receive the commutated output of winding 19, and busses 77a and 78a that of winding 19a, then if for convenience we designate the first, third, fifth and other odd-ordinal moving and stationary contacts as respectively 51, 54 and 55, and the second, fourth, sixth and other even ordinal ones as 51a, 54a and 55a, the connection of the contacts to the busses should be, throughout: members 54 to members 77, 55 to 78, 54a to 77a, and 55a to 78a. In other words the plain cardinals relate to one complete output system and those with the suffix a, to the other.

With the contacts and duplicate bus-pairs thus interconnected, we may draw off the power via two pairs of independent mains, 87, 88 and 87a, 88a respectively. It will be seen that these independent mains may be connected in simple series as illustrated in Fig. 1, or in the three-wire plan by adding a neutral outlet 87n to the junction 87, 87a, also illustrated, or in parallel.

Again referring to Fig. 1, there is shown inserted in each alternating-current supply lead 28 an inductive reactor 95, with the commutative actuator leads 29 tapped next the transformer. Such employment of reactors in my invention gives certain results peculiar thereto, as will now be explained.

Where warranted by the size of the conversion apparatus and the amount of generative capacity in the alternating-current power supply system, reactors thus installed may be employed to limit the magnitude of a current rush into the converter from the alternating current source in the event of a shortcircuit, not only according to their known behavior when so employed with other apparatus but also because of an additional effect. That is to say, my invention has the added element that for shortcircuits occurring in the output system beyond the converter, the commutation strongly cooperates with the performance of the reactors 95 to limit further the amount of the current rush. This cooperation is effective in each instance for a relatively short while; but its start is instantaneous, and its duration is a sufficient time in which circuit-breakers may open or the fault become cleared.

The principle of the protective coaction between the reactors and the commutators in the vibratory example of the latter, is that a sudden large increase of current occasioned by a shortcircuit causes a large and sudden shifting in the time phase of the current, and especially of the voltage immediately across the input to the transformer; while the time phase of the vibration of the commutative parts can change only more gradually because of mechanical inertia. As a result, the commutation is instantly thrown far out of step with the voltage output to be commutated, i. e., it is thrown across a span of the secondary winding that is angularly far from the one giving maximum voltage. The resultant instantaneous reduction of output voltage greatly reduces the magnitude of current rush that otherwise would have occurred. While the few coils commutatively thus shortcircuited out of their normal turns will individually suffer current surges due to their considerable induced voltages, these local rushes do not in any wise compare with the magnitude of an unhampered main-line shortcircuit.

For certain operative requirements, reactors 95 may be made to serve an additional function, where the power input into the converter is that of alternating currents. It is that of imparting to the output voltage a desired droop with increasing current, as for use in some electrolytic operations. As in reaction voltage drooping exploited in alternating-current supply, there is with increasing current a decrease of power factor of the input to the converter. An operative limitation is that the load changes shall not be repeatedly sudden, but rather the gradual variations that are to be expected in the mentioned typical utilization.

In some cases it is desirable to supply a part or all of the wattless current of excitation of the transformer, the actuators and any other electromagnetic accessories of the converter, by means of static condensers or their electrical equivalents, such as electrolytic or synchronous condensers. Such an arrangement is diagrammed in Fig. 1 by the three leads 96 and the condensers 97, shown connected in delta for the three-phase system. It will be understood that the condensers 97 could be of other number than three and connected in other manner than shown, to the primary or secondary or even in auxiliary winding. Preferably, any such arrangement should be symmetrical. If at the converter's rated frequency (e. g., 60 cycles per second) the capacity of these condensers is closely tuned to the effective inductance of all the electromagnetic members, their function becomes maximally effective and they tend largely to stabilize the operation of the entire system including the tuned reeds.

Where the converter is operated with direct-current input, such a condensive auxiliary may supply all of the polyphase excitation if means, not forming a part of my present invention, be provided to set going the processional electromagnetic and mechanical actions in the commutative system and to assure their orderly continuance.

The mode of operation of my improved converters is further and more specifically explained as follows, with special attention to the example of direct-current to direct-current conversion. For starting the operation of the illustrated unit, it is only necessary to impress polyphase voltage of proper frequency upon the converter by way of leads 28, provided the reeds have been polarized with permanent magnetism as already explained. Thereupon the polyphase excitation starts the travel of waves of flux polarity in the transformer's core system and, synchronously therewith, the reeds are electromagnetically driven in their continuous, processionally phased vibration, and their contacts 51 caused to engage the stationary contacts in coordination with the transformer flux travel. As now to be detailed, this joint action causes the transformer's induced voltages to be correctly commutated; so that power currents may be carried through the commutators.

In Fig. 3 as shown by the full-line curve for my converter, the load current (ordinate) in a commutated coil upon reaching the time abscissa A is by the commutative short circuit reduced to zero by the time 0; the suddenness of the reduction being due to the nearly zero self-inductance of the coil. The current of this coil remains about zero while the shortcircuit persists. Upon the opening thereof at time 0', the current in the now reverse-connected coil passes to the negative full value at time B, suddenly again because of the neutralized self-inductance. In the dash-line curve, the more familiar commutative cycle is shown for comparison, where the full forward current at time A passes more gradually to the full reversed current at B in a coil of substantial inductance, with the necessary external help of considerable brush-contact resistance or of auxiliary induction of reversing voltages.

It may here be observed that in the example: (1) The steps of tapping either secondary winding 19 or 19a by the commutative leads 22 each embrace two coils 17; (2) that these steps for 19 and 19a are staggered to one another; (3) that the pitch of the primary winding is short of a pole span by one slot; (4) that the right and left actuators 15a, 15a are similar and so connected that the vibration phase of a given reed of the secondary commutator is the same as that of the co-linear one of the primary commutator; and (5) that the starting and ending of contact by each member 51 with its mates 54 and 55 is mechanically adjustable independently of its neighbors or of the other commutator.

As there are on the low-tension side two interspersed but separate windings and commutators, it is necessary that at any instant the span of contacting shall be such as to cause shortcircuit of coils in each winding 19 and 19a. In other words, two members 51 and two members 51a, or four in all, must be simultaneously engaged with their inner and outer mates. At two zones in the transformer of Fig. 1, the secondary leads 22 exemplifying such sequence are marked $a$, $b$, $c$, $d$ and $a'$, $b'$, $c'$, $d'$ respectively. At the given instant there are shortcircuited in the left commutating zone the two coils from $a$ to $c$ in the winding 19 and the two from $b$ to $d$ in 19a. Thus four secondary coils 17 are shortcircuited in each zone of commutation; and since the inductive effect of declining forward current and increasing reverse current is continuous in direction, the equal opposition between primary and secondary ampere-turns requires that the same number, four primary coils 18G be simultaneously shortcircuited at each contacting zone. This is equivalent to two Siemens coils 18S, and requires that three primary contacts 51 shall be mating with their stationary partners at any instant in each zone. In Fig. 1 the leads 26 of the ones concerned thus are designated P, Q, R and P', Q', R' respectively.

Since the foregoing coordination in the transformer requires that three primary moving contacts should be engaged with their mates while four secondary moving members are in contact with their own, advantage is taken of the independent adjustability of contact duration stated in the fifth observation above. To that end it is only necessary to cause the primary contacts to be engaged ¾ as long as are the secondary members. The frequency is unaffected; the primary ensemble does not perform a waltz accompaniment to the secondary movement in common time, but their periods of tapping differ.

Reversing voltages may be employed in my improved converter, by slightly shifting the timing of the contacting with respect to the voltage neutral point. Since with cosynchronous dual commutation the reactive voltage is practically zero, only the resistive drop in the coils and their short leads remains to be compensated and this, except in high-voltage windings, is so small that sparkling therefrom requires little compensation or may be neglected. If experimentally the contact timing is properly adjusted in general, the compensation by small reversing voltages is apt to be included without specific attention.

As to its general arrangement, the internal grand division of my improved converter is a pair of poles of the transformer and commutators. If there are plural pairs, they may be compounded not only by paralleling in the same manner as in rotary machines, but also by series interconnection such as is not feasible in ordinary rotary units.

With the parallel grouping, a converter of say twelve poles may be built to have an ampere capacity sixfold that of one of its polar pairs. If on the other hand each grand division of the winding be closed upon itself as a bipolar Gramme ring or Siemens drum and if the commutator busses be correspondingly divided into sections. these sections may be connected in series and the converter operated at multiplied voltage. It is also quite practicable to build multipolar converters, inverters or direct-current transformers of high voltage ratios, by connecting the polar pairs in series on the one side and in parallel on the other.

While the contacting systems for effecting the commutation of my improved conversion have been described with reference to preferred designs based upon the vibratory movement of tuned reeds, it is to be understood that other suitably actuated contact arrangements may be employed therefor. As examples, such other schemes may include those operating by vibratory movements of liquid metals as in jets, pools, etc. Commutation by means of tuned vibratory elements as herein exemplified has the distinctive utility that the overall apparatus is quasi-stationary and that the actuative accessories are very simple.

Figure 10:
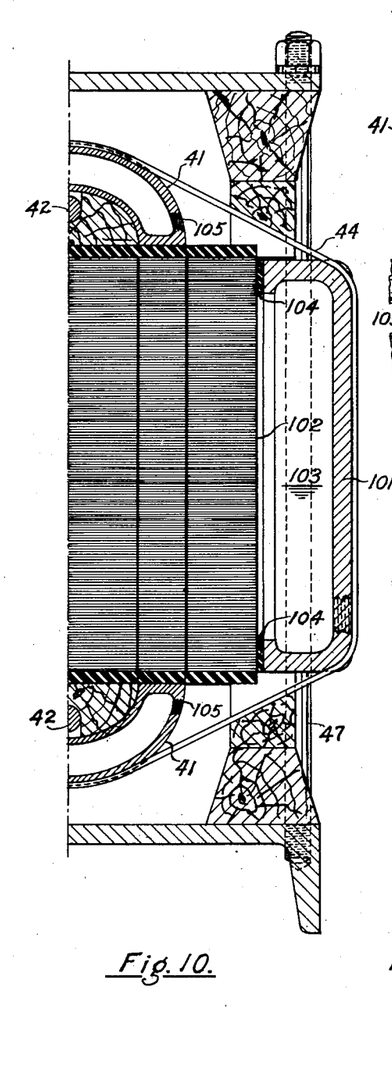
Fig. 10 is a vertical cross-section of half the transformer, in the plane 10—10 identified in Fig. 11, showing on a somewhat larger scale the main parts of the transformer, and the forms and relations of certain improved means of cooling the coils and laminations.
Figure 11:
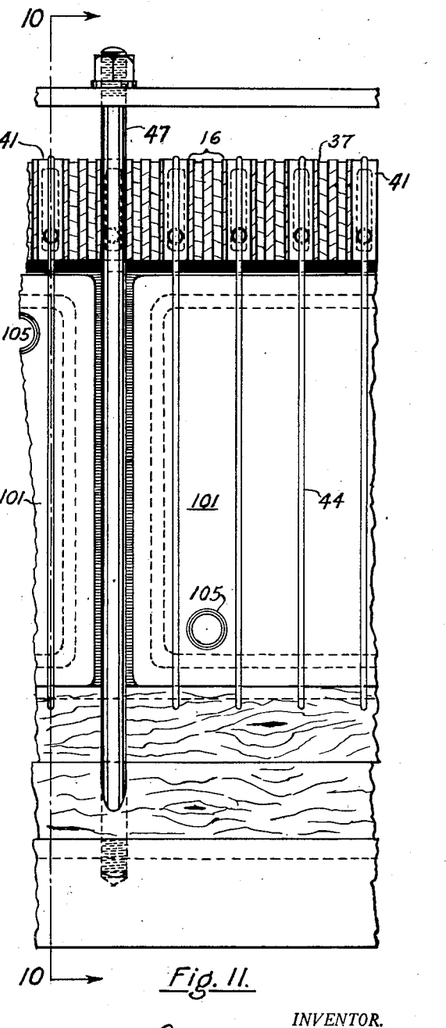
Fig. 11 is a corresponding elevation of a portion of the length of the transformer, assembled with the improved cooling means shown in Fig. 10, and with the upper wooden blocks removed.

The transformer forming a part of my improved converter may be cooled in conventional ways including immersion in oil or blowing with air; but it is advantageous in many cases to employ a cooling method and means especially devised therefor, and described as follows. Referring to Figs. 10 and 11, the plates 41 fitted between the coils to serve as spacing members as aforesaid, may be made to serve also in cooling the coils, if these plates be constructed hollow and a cooling fluid such as water be circulated therethrough. In Fig. 11 the wooden blocks 43 and 48 are omitted or considered transparent, in order to show these plates 41 and the coil-couples 16 more clearly.

For cooling the laminations and the portions of the coils embedded therein, there may be pressed against the sides of the yokes 33, 33 other hollow, fluid cooled plates 101, 101 clamped for example by the tensile bands 44. All of these cooling plates would be made of metal and should, of course, be insulated from the electric circuits and the magnetic laminations of the transformer. The coil-intermediate plates 41 are of such shape as not to act as secondary inductors (beyond the small Foucault effect of leakage flux) to the transformer coils.

To increase the efficiency and thus lower the temperature gradient of the heat transfer from the laminations to the cooling fluid in a plate 101, the wall 102 thereof next the laminations may comprise a pane of foil of high thermal conductivity such as aluminum, held against the laminations by the pressure of the cooling fluid 103 and bound by the elastic gasket 104. The foil should be insulated from the edges of the laminations, as by thin varnish or well oxidized surface of the aluminum. Fluid circulation may be effected as via ports 105 and suitable piping, through plates 41 and 101. Obviously the ends of the core system could be cooled by plates (not shown) of the same type as those, 101, 101, shown on the side.

Within the scope of my improved conversion, many variations of apparatus design and of the method of its performance may be exploited. To those skilled in the art, the examples given will suggest others. Accordingly, I wish to be limited not to the exact disclosure herein set forth by representative types, but rather to the true scope of my invention in relation to the prior art, as delimited by the following claims.

I claim:

1. The method of transferring power between separate currents whereof at least one is unidirectional, which comprises supplying polyphase currents to a static transformer having a polyphase primary and a polyphase secondary winding each of which is formed of numerous unitary sections, each section electromagnetically closely coupled with the corresponding section of each other winding; and commutating by a separate contacting system the voltages induced in each winding that is in conductive relation with a said unidirectional current.

2. In transferring power between separate unidirectional currents, the method according to claim 1 wherein the separate contacting systems are actuated in such wise that each section of the primary winding and each corresponding section of the secondary winding are commutatively shortcircuited substantially cosynchronously.

3. The method of converting between alternating-current and direct-current power which comprises supplying polyphase current to a non-rotary converter having a ferromagnetic core and, on its alternating-current side and separately on its direct-current side, a transformer winding formed of unitary sections interconnected in the fashion of armature coils, each section inductively closely coupled with the corresponding section of the other winding, and on its direct-current side a vibratory commutator; operating the converter in such wise that there is no flux change in the core caused by the commutation; and conducting power to the direct-current external circuit through the vibratory commutator.

4. The method of conversion from alternating-current power to direct-current power with limited rush of energy in the event of and into a shortcircuit of the output current mains, which comprises jointly operating polyphase static transformation, vibratory commutative contacting, and inductive reactance in series with the leads supplying alternating current for the operation, in such wise that any sudden large increase of current through said reactance causes in the voltages induced in the transformation a phase displacement with respect to the temporarily unchanged timing of the commutative contacting.

5. The method of conversion from alternating-current power of substantially constant voltage to direct-current power of voltage that strongly decreases with increase of the direct current, which comprises jointly operating polyphase static transformation, vibratory commutative contacting and, in series with the leads supplying alternating current for the operation, inductive reactance of such value that gradual increase of current therethrough causes a desired amount of decrease in the output voltage of the conversion.

6. The method of transforming between direct currents which comprises supplying direct current, commutating it through a vibratory contacting system into one winding of a polyphase transformer; withdrawing power as alternating current from another winding thereof and, through a second vibratory contacting system, commutating said alternating currents into direct current delivered to an output circuit; separately supplying magnetization to the transformer; and actuating said vibratory contacting systems suitably to effect their respective commutative performances cosynchronously.

7. The method according to claim 6 wherein the magnetization of the transformer is supplied from a source of polyphase exciting currents, directly through leads to one of the windings.

8. The method according to claim 6 wherein the actuating of the vibratory contacting systems is effected by supplying polyphase currents to suitable electromagnetic accessories thereof.

9. The method according to claim 6 wherein the functions of magnetizing the transformer and actuating the vibratory contacting systems are effected by supplying polyphase currents of the same frequency for both operations.

10. Apparatus for transferring power between unidirectional separate currents, which comprises the combination with a polyphase transformer, of a commutative contacting system connected with the transformer's primary winding and another with its secondary winding; electromagnetic means actuating the contacting systems in such wise that the commutation is effected cosynchronously with respect to the primary and secondary windings; and means for excitation of said transformer and said electromagnetic actuating means by polyphase alternating currents.

11. Apparatus according to claim 10 wherein the means for performing said excitation comprises electrostatic condensers tuned, at the rated frequency of said alternating current, to approximate resonance with the combined inductances of said transformer and said actuating means.

12. Apparatus according to claim 10 wherein the windings of the polyphase transformer are constructed of numerous unitary sections whereof each one in the primary winding is arranged spatially so intimate with the corresponding one in the secondary winding as to prevent substantial magnetic leakage therebetween.

13. Apparatus according to claim 10 wherein the contacting systems are vibratory, and wherein the means actuating these systems comprises electromagnetic mechanism connected to a winding of the transformer in phase relation to effect commutative shortcircuiting of each portion of the primary winding and each corresponding portion of the secondary winding through substantially simultaneous cycles.

14. Apparatus according to claim 10 wherein the means for excitation of the transformer and of the actuating means comprises leads from an electromagnetic alternating-current source, and current-limiting inductances inserted in said leads.

15. Apparatus according to claim 10 wherein the transformer, having windings formed of unitary sections within each of which the mating primary and secondary elements are built spatially intimate for closeness of inductive coupling, is electrically connected with the said contacting systems and with electromagnetic vibratory mechanism jointly for causing said mating primary and secondary winding elements to be commutatively shortcircuited through substantially simultaneous cycles.

16. Power converting apparatus comprising a polyphase static transformer and cooperative commutating members, wherein the laminated ferromagnetic structure of the transformer is rectilinear and comprises an elongated central core, equally long flux-return yokes bilateral to and each about half as wide as the central core, and numerous teeth and slots intervening between the core and the yokes; the teeth at both ends of the structure having each about half the cross-section for magnetic flux that has the central core.

17. Apparatus according to claim 16 wherein the teeth are non-integral with and separated from the central core and the yokes by relatively thin gaps.

18. Apparatus according to claim 16 wherein the teeth are integral with the central core and the yokes and wherein the intermediate teeth are narrow enough to be worked at substantially higher magnetic flux density than the core, the yokes and the end teeth.

19. Power converting apparatus comprising a polyphase static transformer of subdivided shell-type construction, with the windings subdivided in units, each unit formed of closely coupled primary and secondary coils.

20. Apparatus according to claim 19 wherein the transformer core system is clamped by tensile girth bands.

21. Apparatus according to claim 19 wherein the non-embedded portions of the coils and certain of the faces of the ferromagnetic core system are in heat-transferring relation with hollow members that are arranged for internal circulation of cooling fluid.

22. Power converting apparatus comprising a polyphase static transformer including a core of shell-type construction, and polar windings on said core and subdivided into units, each unit comprising a closely coupled primary and secondary coil.

23. The invention as claimed in claim 22, wherein adjacent units of said polar windings are separated by ferromagnetic core material.

24. The invention as claimed in claim 22, in combination with hollow members in heat transfer relation with said windings, and means for circulating a cooling fluid through said members.

GEORGE T. SOUTHGATE.